Sept. 22, 1925.                    1,554,570
F. L. GATCHET
DIRECTION INDICATOR
Filed Jan. 21, 1920
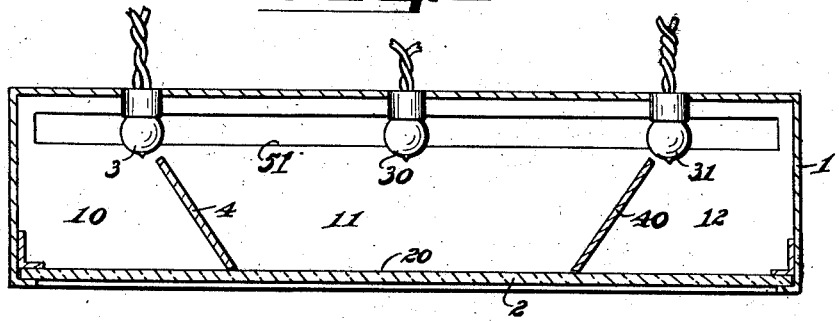
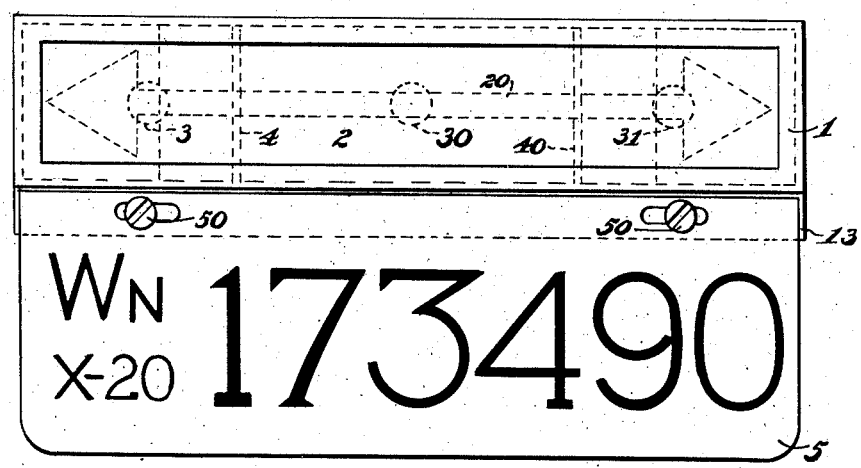
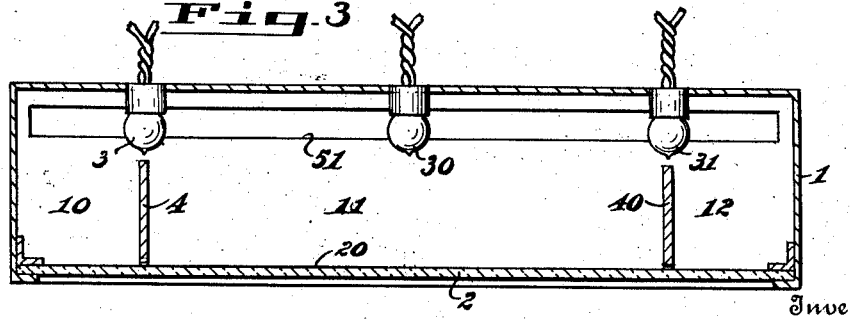
Inventor
*Francis L. Gatchet*
By *Richard J. Cook*
Attorney Patented Sept. 22, 1925.

1,554,570

UNITED STATES PATENT OFFICE.

FRANCIS L. GATCHET, OF SEATTLE, WASHINGTON.

DIRECTION INDICATOR.

Application filed January 21, 1920. Serial No. 353,022.

*To all whom it may concern:*

Be it known that I, FRANCIS L. GATCHET, a citizen of the United States, and resident of the city of Seattle, county of King, and State of Washington, have invented certain new and useful Improvements in Direction Indicators, of which the following is a specification.

My invention relates to devices which are intended for use as combined tail and signal lights for automobiles.

The object of my invention is to provide a device which normally may be employed as a tail light for automobiles and which, when desired, may be employed for indicating the direction in which the driver contemplates turning, thereby serving as a signal or warning light.

The features of my invention which I deem to be new and upon which I desire to secure patent protection, will first be described and then particularly defined by the claims.

In the accompanying drawings I have shown my invention embodied in the type of construction which I now most prefer to use.

Figure 1 is a horizontal section through the device.

Figure 2 is an elevation of the device, showing the signal face, or that which is placed rearwardly when mounted upon a car.

Figure 3 is a horizontal section through a construction which varies only slightly from that shown in Figure 1.

The most distinctive feature of my invention consists in employing a box having a series of compartments, for each of which a light is provided, two of these lights being so located that each will illuminate two adjacent compartments, while the third light is placed so that it can illuminate only one compartment. With such a construction it is possible, by controlling the current to the respective lights, to illuminate either the central compartment or the central compartment together with either of the end compartments, and thereby to produce signals indicating a turn in either direction, or a plain warning light of the nature of the ordinary tail light.

The signal apparatus is contained within a box, as 1. The surface of this box which is visible from the rear, is closed only by a glass 2, which glass is preferably a ground or frosted glass. Upon the inner surface of this glass is painted or otherwise provided, an arrow 20, or other warning indication. This would preferably be of a distinctive color, as red. This arrow is provided with two heads, one at each end, and is thus a double headed arrow. If this arrow be illuminated except for one head, it will indicate the direction in which it is the intention of the driver to turn. By control of the lighting of the lamps, either head of the arrow may be illuminated, while the other is dark and, therefore, invisible.

The lights 3, 30, and 31, are located at points distributed along the length of the box. One of these, as light 30, is located centrally of the box, while the others are located towards the ends of the box. Two partitions, 4 and 40, are placed within the box and extend from, or adjacent to the glass 2, back towards the lights 3 and 31, respectively, stopping a little short of the lights. In other words, these partitions are so placed that the end lights are in line with the partitions, whereby these end lights are enabled to illuminate the compartments at both sides of its respective compartments 10 and 11, while light 31 will illuminate compartments 11 and 12. The position of the partitions 4 and 40 with relation to the central light 30, is such that it can illuminate only the central compartment 11.

The lights 3, 30 and 31, are controlled in their illumination by a switch or switches, located so as to be under control of the driver. As the manner and the mechanism for doing this is something which may be provided by any person familiar with installation of electric apparatus, the construction of the same is not herein shown and its description will, therefore, not be attempted. It will suffice to say that the result desired, is the illumination of one only of these lamps at a time, or the joint illumination of the central light along with one or the other, but not both, of the end lights. The manner of connecting these lamps is immaterial, so long as the result mentioned is secured.

I prefer to provide the box with a flange, as 13, extending from one side thereof, in a vertical direction, this being intended for securing the box to the car or for securing thereto a license plate, as 5, or for accomplishing both purposes. As herein shown, this flange 13 extends downwardly and the license plate 5 is secured thereto by bolts or screws 50. This license plate may be illuminated through a slot, as 51, placed in the wall of the box which is towards the plate 5.

In operating my device the central light 30 may be continuously illuminated. This will illuminate the portion of the glass plate 2, which extends between the outer edges of the partitions 4 and 40. If it be desired by the driver to turn to the right, he will so handle his switch as to illuminate the compartment 12, by turning on the light 31. This will make visible the head of the arrow which is at that end of the box, thus giving a warning signal. If it be his desire or intention to turn to the left, the light 3 is turned on, which will illuminate the compartment 10. If it is his intention to proceed straight ahead he will turn the switch so that only the light 30 is illuminated.

The switch and its connections may be such that it will provide current to one only of the lamps at a time. When the lamp 30 only is illuminated, only the central portion of the staff of the arrow is visible, this would consist only of a broad red band. The two heads of the arrow and that portion of the shaft which lies outside of the two partitions would not show. With either of the side lights on this central part of the arrow shaft 30 and the head at that side will show.

What I claim as new is:

1. A signal device comprising a lamp housing having a light slot extending through the rear wall thereof, said light slot having direction indications formed as continuations of each end thereof, a pair of lamps disposed within the housing and near the opposite ends of said slot, and baffle means whereby the lighting of one lamp will illuminate the center of the slot and one end thereof.

2. A signal device comprising a housing, a transparent area in one wall of the housing, said transparent area being in the form of a central section having indicating heads formed as a continuation of each end thereof, a pair of lamps in the housing, and means whereby the lighting of either lamp will illuminate the central section and one head of the transparent area.

Signed at Seattle, Washington, this 31st day of December, 1919.

FRANCIS L. GATCHET.